United States Patent
Schlehahn et al.

(10) Patent No.: US 9,599,782 B2
(45) Date of Patent: Mar. 21, 2017

(54) OPTOELECTRONIC DEVICE

(71) Applicant: Technische Universitaet Berlin, Berlin (DE)

(72) Inventors: Alexander Schlehahn, Berlin (DE); Tobias Heindel, Berlin (DE); Sven Rodt, Berlin (DE); Stephan Reitzenstein, Berlin (DE)

(73) Assignee: Technische Universitaet Berlin, Berlin (DE)

( * ) Notice: Subject to any disclaimer, the term of this patent is extended or adjusted under 35 U.S.C. 154(b) by 9 days.

(21) Appl. No.: 14/699,605

(22) Filed: Apr. 29, 2015

(65) Prior Publication Data

US 2016/0320575 A1     Nov. 3, 2016

(51) Int. Cl.
*G02B 6/36*          (2006.01)
*G02B 6/42*          (2006.01)

(52) U.S. Cl.
CPC .......... *G02B 6/4274* (2013.01); *G02B 6/4293* (2013.01); *G02B 6/4202* (2013.01); *G02B 6/4262* (2013.01)

(58) Field of Classification Search
CPC ............................ G02B 6/4262; G02B 6/4274
USPC ..................................... 385/88, 92
See application file for complete search history.

(56) References Cited

U.S. PATENT DOCUMENTS

| | | | |
|---|---|---|---|
| 5,048,919 A | 9/1991 | Ladany | |
| 5,434,940 A | 7/1995 | Roff et al. | |
| 5,574,815 A | 11/1996 | Kneeland | |
| 6,092,935 A * | 7/2000 | Althaus | G02B 6/4214 385/92 |
| 2004/0032747 A1 | 2/2004 | Currie et al. | |
| 2004/0228583 A1 | 11/2004 | Iwai | |
| 2004/0247250 A1 | 12/2004 | Lee | |
| 2014/0072311 A1 | 3/2014 | Giziewicz et al. | |

FOREIGN PATENT DOCUMENTS

| | | |
|---|---|---|
| DE | 26 30 340 A1 | 1/1978 |
| DE | 243 123 A1 | 2/1987 |
| EP | 0 726 477 A2 | 1/1996 |
| EP | 1 061 391 A2 | 6/2000 |
| WO | WO-2012/031780 | 3/2012 |

OTHER PUBLICATIONS

Miller et. al., "Compact cryogenic self-aligning fiber-to-detector coupling with losses below one percent", OPTICS EXPRESS 9102, vol. 19, No. 10, published Apr. 25, 2011.
European Search Report mailed Jul. 11, 2016 issued in European Patent Application No. 16 16 6799.3.

* cited by examiner

*Primary Examiner* — Jerry Blevins
(74) *Attorney, Agent, or Firm* — Gordon & Rees LLP

(57) ABSTRACT

An embodiment of the present invention relates to an optoelectronic device comprising an optoelectronic component, a waveguide having an optical waveguide section and an electrical conductor section, the optical waveguide section being transparent for radiation of a given wavelength or a given wavelength range and capable of guiding the radiation along the longitudinal axis of the waveguide, wherein the optical waveguide section is optically butt-coupled to an optical surface section of the optoelectronic component, and wherein the electrical conductor section is mechanically butt-coupled to an electrical contact of the optoelectronic component.

20 Claims, 4 Drawing Sheets

OPTOELECTRONIC DEVICE

The present invention relates to optoelectronic devices.

BACKGROUND OF THE INVENTION

The publication "Compact cryogenic self-aligning fiber-to-detector coupling with losses below one percent" (A. J. Miller, A. E. Lita, B. Calkins, I. Vayshenker, S. M. Gruber, S. W. Nam; Optics Express, 9102, 9 May 2011, Vol. 19 No. 10, Optical Society of America) discloses a packaging technique for coupling light from a single-mode telecommunication fiber to cryogenic single-photon sensitive devices.

Objective of the Present Invention

An objective of the present invention is to provide an optoelectronic device which allows connecting an optoelectronic component of the optoelectronic device to external components in an efficient and reliable way.

BRIEF SUMMARY OF THE INVENTION

An embodiment of the present invention relates to an optoelectronic device comprising an optoelectronic component, a waveguide having an optical waveguide section and an electrical conductor section, the optical waveguide section being transparent for radiation of a given wavelength or a given wavelength range and capable of guiding the radiation along the longitudinal axis of the waveguide, wherein the optical waveguide section is optically butt-coupled to an optical surface section of the optoelectronic component, and wherein the electrical conductor section is mechanically butt-coupled to an electrical contact of the optoelectronic component.

An advantage of this embodiment of the invention is that the waveguide has both an optical waveguide section and an electrical conductor section. Therefore, the electrical and optical coupling of the optoelectronic component to an external device may be achieved in a single step by coupling the waveguide to the optoelectronic component. In other words, a single butt-coupling step provides both the optical connection and the electrical connection.

The optical waveguide section is preferably an inner section of the waveguide, and the electrical conductor section is preferably an outer section of the waveguide.

The inner optical waveguide section may be an optical fiber. Alternatively, the inner optical waveguide section may be formed by a bundle of optical fibers.

The electrical conductor section may be a metal sleeve that surrounds the inner optical waveguide section. Alternatively, the waveguide may comprise two or more electrical conductor sections which are located at the outer surface of the optical waveguide section. The electrical conductor sections are preferably separated from one another and are each capable of guiding electrical current along the longitudinal axis of the waveguide.

The optical surface section and the electrical contact are preferably located on the same side (e.g. front side) of the optoelectronic component. A second electrical contact of the optoelectronic component may be located on the opposite side (e.g. backside) of the optoelectronic component.

Further, the optoelectronic component may comprise two or more electrical contacts which are located on the same side (e.g. front side) of the optoelectronic component. In this case, each of these electrical contacts is preferably coupled to an individual electrical conductor section of the waveguide.

The optoelectronic device preferably comprises a housing having a first opening and a second opening. The optoelectronic component is preferably located inside the housing.

In the latter embodiment, the optical waveguide section of the waveguide preferably passes through the first opening. The above mentioned second electrical contact of the optoelectronic device is preferably contacted through the second opening.

The housing is preferably electrically conductive. This allows electrically connecting the housing to the electrical conductor section of the waveguide and to use the housing as an external conductor.

The housing is preferably tubular. In this case, the first and second openings are preferably located at opposing ends of the tubular housing, wherein the optical surface section and the electrical contact of the optoelectronic component face the first opening of the tubular housing, and the second electrical contact of the optoelectronic component faces the second opening of the tubular housing.

Further, dielectric material may be located inside the tubular housing. In this case, it is advantageous if the dielectric material radially positions the optoelectronic component inside the housing.

The optoelectronic device may comprise a tubular sleeve which is located between the dielectric material and the optoelectronic component. The tubular sleeve may hold the optoelectronic component inside the housing.

According to a preferred embodiment, the optoelectronic device comprises a tubular housing having a first end and a second end, the first and second ends being opposite to each other, wherein the optical surface section and the electrical contact of the optoelectronic component face the first end of the tubular housing, and wherein a second electrical contact of the optoelectronic component faces the second end of the tubular housing.

In the latter embodiment, it is advantageous if the optoelectronic device comprises an inner conductor which is connected to the second electrical contact of the optoelectronic component and located between the second electrical contact of the optoelectronic component and the second end of the tubular housing. The inner conductor and the tubular housing preferably form an electrical coaxial transmission line between the second electrical contact of the optoelectronic component and the second end of the tubular housing.

The inner conductor, the waveguide and the tubular housing are preferably aligned in coaxial relation.

According to another preferred embodiment, the optoelectronic device comprises a housing which is electrically conductive and electrically connected to the electrical conductor section of the waveguide. The housing may comprise a first opening which forms an optical interface of the optoelectronic device, and a second opening which forms an electrical interface of the optoelectronic device.

The electrical interface of the optoelectronic device preferably comprises a first electrical contact and a second electrical contact, wherein the first electrical contact is formed by an inner conductor which is located between the second opening and the optoelectronic component, and wherein the second electrical contact is formed by the housing. The inner conductor is preferably located coaxially inside the housing.

Further, the housing preferably comprises a thread adjacent to the first opening. The thread may hold a cap which aligns the waveguide relative to the housing and electrically connects the housing with the electrical conductor section of the waveguide.

Additionally or alternatively, the housing may comprise a thread adjacent to the second opening. The thread may be configured to hold a connector of an external coaxial transmission line.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended figures. Understanding that these figures depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENTS

The preferred embodiments of the present invention will be best understood by reference to the drawings, wherein identical or comparable parts are designated by the same reference signs throughout.

It will be readily understood that the present invention, as generally described herein, could vary in a wide range. Thus, the following more detailed description of the exemplary embodiments of the present invention, is not intended to limit the scope of the invention, as claimed, but is merely representative of presently preferred embodiments of the invention.

Figure 1:
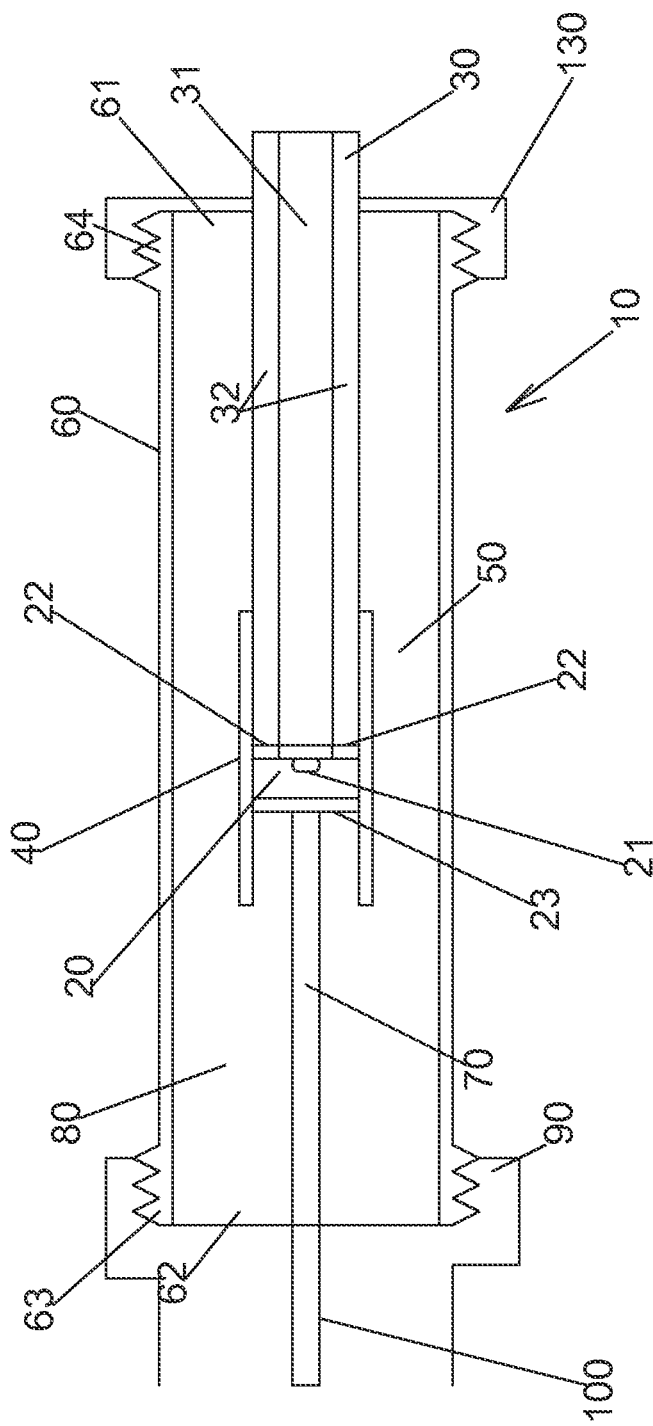
FIG. 1 shows an exemplary embodiment of an optoelectronic device according to the present invention in a schematic representation.

FIG. 1 shows an exemplary embodiment of an optoelectronic device 10 according to the present invention.

The optoelectronic device 10 comprises an optoelectronic component 20 which has an optical surface section 21, a first electrical contact 22 and a second electrical contact 23. The optoelectronic component 20 may be a radiation emitter (e.g. a LED or laser) or a radiation detector.

The optical surface section 21 and the first electrical contact 22 are located on the same side, e.g. the front side, of the optoelectronic component 20. The second electrical contact 23 is located on the opposite side, e.g. the backside, of the optoelectronic component 20. A waveguide 30 is butt-coupled to the front side of the optoelectronic component 20.

The optoelectronic component 20 is located in and held by a tubular sleeve 40. The tubular sleeve 40 consists of insulating material such as a ceramic material, for instance.

The inner diameter or cross-section of the tubular sleeve 40 corresponds to or equals the outer diameters or cross-sections of the optoelectronic component 20 and the waveguide 30 in order to allow an automatic self-alignment between the optoelectronic component 20 and the waveguide 30 relative to each other when the waveguide 30 is butt-coupled to the optoelectronic component 20.

A dielectric material 50 separates the tubular sleeve 40 from a housing 60 and holds the tubular sleeve 40 coaxially inside the housing 60. The housing 60 is tubular and consists of conductive material, e.g. a metal.

The housing 60 has a first opening 61 at a first end of the tubular housing, and a second opening 62 at a second end of the tubular housing. As will be apparent hereinafter, the first opening 61 forms an optical interface of the optoelectronic device 10, and the second opening 62 forms an electrical interface of the optoelectronic device 10.

An inner conductor 70 is connected to the second electrical contact 23 of the optoelectronic component 20 and located between the second electrical contact 23 and the second opening 62 of the tubular housing 60. The inner conductor 70 and the tubular housing 60 form an inner electrical coaxial transmission line 80 between the second electrical contact 23 of the optoelectronic component 20 and the second opening 62 of the tubular housing 60.

In order to allow for a connector 90 of an external coaxial transmission line 100 to be connected to the inner electrical coaxial transmission line 80, the housing 60 comprises a thread 63 adjacent to the second opening 62. The thread 63 allows screwing the connector 90 onto the housing 60.

The waveguide 30 connects the first opening 61 with the first electrical contact 22 and the optical surface section 21 of the optoelectronic component 20. To this end, the waveguide 30 has an optical waveguide section 31 and an electrical conductor section 32.

The optical waveguide section 31 is transparent for radiation of a given wavelength or a given wavelength range and capable of guiding the radiation along the longitudinal axis of the waveguide 30. The optical waveguide section 31 is optically butt-coupled to the optical surface section 21 of the optoelectronic component 20.

In the exemplary embodiment shown in FIG. 1, the first electrical contact 22 of the optoelectronic component 20 is formed by a metal ring which surrounds the inner optical surface section 21. In order to allow a butt-coupling of the electrical conductor section 32 of the waveguide 30 with the first electrical contact 22, the electrical conductor section 32 is preferably formed by a metal sleeve which surrounds the inner optical waveguide section 31.

The housing 60 further comprises a thread 64 for mounting a cap 130. The cap consists of conductive material such as a metal, for instance. The cap 130 electrically connects the electrical conductor section 32 of the waveguide 30 with the housing 60 and therefore with the connector 90 of the external coaxial transmission line 100.

Since the external coaxial transmission line 100 is connected to the first and second electrical contacts 22 and 23 of the optoelectronic component 20, the optoelectronic component 20 may be electrically operated through the second opening 62 and therefore via the external coaxial transmission line 100. The first opening 61 of the housing 60 then serves as the optical interface of the optoelectronic device 10.

The optoelectronic device 10 may be fabricated as follows:

The tubular sleeve 40 is inserted into a hole in the dielectric material 50. The hole is preferably positioned coaxially inside the tubular housing 60. Then, the optoelectronic component 20 is inserted and positioned inside the sleeve 40.

By butt-coupling the waveguide 30 with the front side (i.e. the first electrical contact 22 and the optical interface section 21) of the optoelectronic component 20, the optoelectronic component 20 is electrically as well as optically connected to the first opening 61 of the housing 60 at the same time. In other words, a single mounting step provides an electrical and an optical connection with the first opening 61.

Since the inner diameter or cross-section of the tubular sleeve 40 corresponds to or equals the outer diameters or cross-sections of the optoelectronic component 20 and the waveguide 30, an automatic self-alignment between the optoelectronic component 20 and the waveguide 30 is achieved as soon as the waveguide 30 has been inserted into the sleeve 40.

The second electrical contact 23 of the optoelectronic component 20 is electrically connected to the second opening 62 of the housing 60 via the inner conductor 70 of the inner coaxial transmission line 80.

The waveguide 30 may be used to mechanically press the optoelectronic component towards the inner conductor 70 in order to provide for a reliable electrical connection between these components.

Figure 2:
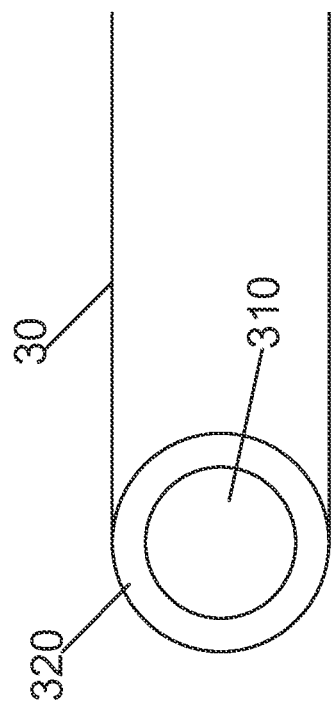

FIG. 2 shows in an exemplary fashion a waveguide 30 which can be used to contact the optoelectronic component 20 of FIG. 1. The waveguide 30 comprises a fiber 310 which forms the inner optical waveguide section 31 in FIG. 1, and a metal sleeve 320 which forms the electrical conductor section 32 in FIG. 1.

Figure 3:
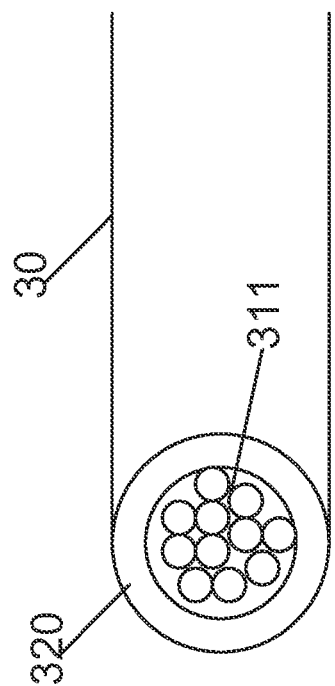
FIGS. 2-7 show different exemplary embodiments of a waveguide suitable for the optoelectronic device according to FIG. 1.

FIG. 3 shows in an exemplary fashion a further embodiment of a waveguide 30 which can be used to contact the optoelectronic component 20 of FIG. 1. The waveguide 30 comprises a fiber bundle 311 which forms the inner optical waveguide section 31 in FIG. 1, and a metal sleeve 320 which forms the electrical conductor section 32 in FIG. 1.

The optoelectronic component 20 of FIG. 1 may alternatively have more than one electrical contact on its front side. FIGS. 4-7 show embodiments of waveguides 30 which are suitable for optoelectronic components with a plurality of electrical contacts on the front side.

Figure 4:
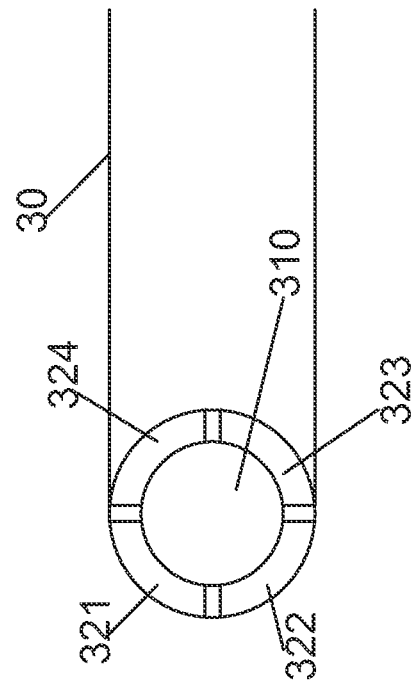

FIG. 4 shows an exemplary embodiment of a waveguide 30 in case that the optoelectronic component 20 has four electrical contacts on its front side which are shaped as ring segments. The waveguide 30 of FIG. 3 comprises four outer ring segments 321, 322, 323, and 324 which are each electrically conductive and formed to match the four electrical contacts on the front side of the optoelectronic component 20.

Figure 5:
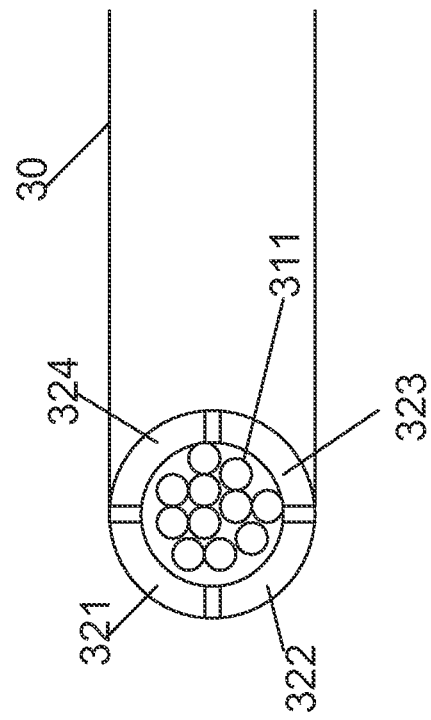

FIG. 5 shows a further exemplary embodiment of a waveguide 30 in case that the optoelectronic component 20 has four electrical contacts on its front side which are shaped as ring segments. The waveguide 30 of FIG. 5 comprises four outer ring segments 321, 322, 323, and 324 which are each electrically conductive and each capable of connecting one of the four electrical contacts on the front side with the first opening 61 of the housing 60. A fiber bundle 311 forms an inner optical waveguide section of the waveguide 30.

Figure 7:
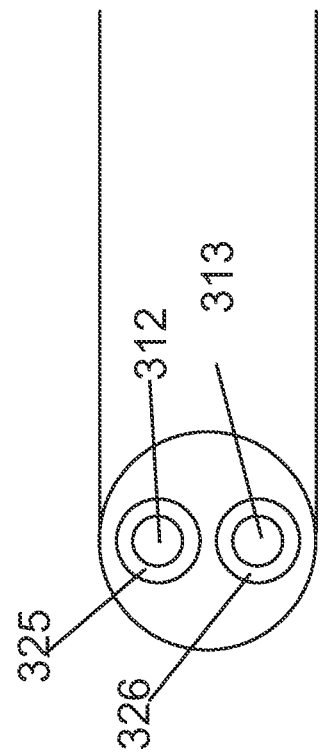
Figure 6:
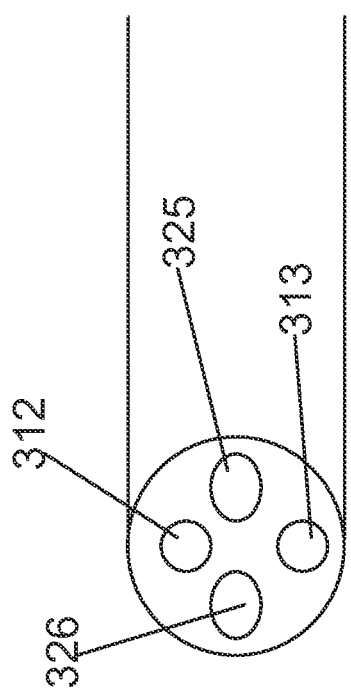

FIGS. 6 and 7 show exemplary embodiments of a waveguide 30 where optical waveguide sections 312 and 313 and electrical conductor sections 325 and 326 are each inner sections of the waveguide 30.

REFERENCE NUMERALS

10 optoelectronic device
20 optoelectronic component
21 optical surface section
22 first electrical contact
23 second electrical contact
30 waveguide
40 tubular sleeve
50 dielectric material
61 first opening
62 second opening
63 thread
64 thread
70 inner conductor
80 inner electrical coaxial transmission line
90 connector
100 external coaxial transmission line
310 optical fiber
311 fiber bundle
320 metal sleeve
321 outer ring segment
322 outer ring segment
323 outer ring segment
324 outer ring segment
325 inner electrical conductor section
326 inner electrical conductor section

The invention claimed is:

1. Optoelectronic device comprising
an optoelectronic component, and
a waveguide having both an optical waveguide section and an electrical conductor section, the optical waveguide section being transparent for radiation of a given wavelength or a given wavelength range and capable of guiding the radiation along the longitudinal axis of the waveguide,
wherein the optical waveguide section is optically butt-coupled to an optical surface section of the optoelectronic component, and
wherein the electrical conductor section of the waveguide is mechanically butt-coupled to an electrical contact of the optoelectronic component.

2. Optoelectronic device of claim 1
wherein the optical waveguide section is an inner section of the waveguide, and
wherein the electrical conductor section is an outer section of the waveguide.

3. Optoelectronic device of claim 2
wherein the inner optical waveguide section is an optical fiber or formed by a bundle of optical fibers.

4. Optoelectronic device of claim 2
wherein the electrical conductor section is a metal sleeve that surrounds the inner optical waveguide section.

5. Optoelectronic device of claim 2
wherein the waveguide comprises two or more electrical conductor sections which are located at the outer surface of the optical waveguide section,
wherein the electrical conductor sections are separated from one another, and
wherein each of the electrical conductor sections is capable of guiding electrical current along the longitudinal axis of the waveguide.

6. Optoelectronic device of claim 5
wherein the optoelectronic component comprises two or more electrical contacts which are located on the same side of the optoelectronic component, and
wherein each of the electrical conductor sections of the waveguide is electrically and mechanically coupled to one of these electrical contacts.

7. Optoelectronic device of claim 1
wherein the optical surface section and the electrical contact are located on the same side of the optoelectronic component, and
wherein a second electrical contact of the optoelectronic component is located on the opposite side of the optoelectronic component.

8. Optoelectronic device of claim 7
wherein the optoelectronic device comprises a housing having a first opening and a second opening,
wherein the optoelectronic component is located inside the housing,
wherein the optical waveguide section of the waveguide passes through the first opening and
wherein the second electrical contact of the optoelectronic device is contacted through the second opening.

9. Optoelectronic device of claim 8
wherein the housing is electrically conductive and electrically connected to the electrical conductor section of the waveguide.

10. Optoelectronic device of claim 8
wherein the housing is tubular,
wherein the first and second openings are located at opposing ends of the tubular housing,
wherein the optical surface section and the electrical contact of the optoelectronic component face the first opening of the tubular housing, and
wherein the second electrical contact of the optoelectronic component faces the second opening of the tubular housing.

11. Optoelectronic device of claim 1
wherein the optoelectronic device comprises a tubular housing and dielectric material located therein,
wherein the dielectric material radially positions the optoelectronic component inside the housing.

12. Optoelectronic device of claim 11
wherein the optoelectronic device comprises a tubular sleeve which is located between the dielectric material and the optoelectronic component.

13. Optoelectronic device of claim 1
wherein the optoelectronic device comprises a tubular housing having a first end and a second end, the first and second ends being opposite to each other,
wherein the optical surface section and the electrical contact of the optoelectronic component face the first end of the tubular housing, and
wherein a second electrical contact of the optoelectronic component faces the second end of the tubular housing.

14. Optoelectronic device of claim 13
wherein the optoelectronic device comprises an inner conductor which is connected to the second electrical contact of the optoelectronic component and located between the second electrical contact of the optoelectronic component and the second end of the tubular housing, and
wherein the inner conductor and the tubular housing form an electrical coaxial transmission line between the second electrical contact of the optoelectronic component and the second end of the tubular housing.

15. Optoelectronic device of claim 14
wherein the inner conductor, the waveguide and the tubular housing are aligned coaxially.

16. Optoelectronic device of claim 1
wherein the optoelectronic device comprises a housing which is electrically conductive and electrically connected to the electrical conductor section of the waveguide,
wherein the housing comprises a first opening which forms an optical interface of the optoelectronic device, and
wherein the housing comprises a second opening which forms an electrical interface of the optoelectronic device.

17. Optoelectronic device of claim 16
wherein the electrical interface of the optoelectronic device comprises a first electrical contact and a second electrical contact,
wherein the first electrical contact is formed by an inner conductor which is located between the second opening and the optoelectronic component, and
wherein the second electrical contact is formed by the housing.

18. Optoelectronic device of claim 17
wherein the inner conductor is located coaxially inside the housing.

19. Optoelectronic device of claim 16
wherein the housing comprises a thread adjacent to the first opening, the thread holding a cap which aligns the waveguide relative to the housing and electrically connects the housing with the electrical conductor section of the waveguide.

20. Optoelectronic device of claim 16
wherein the housing comprises a thread adjacent to the second opening, the thread holding a connector of an external coaxial transmission line.

* * * * *